United States Patent [19]

Gray et al.

[11] Patent Number: 5,664,801
[45] Date of Patent: Sep. 9, 1997

[54] MOUNTING SYSTEM FOR AIRBAG REACTION CANISTER

[75] Inventors: John D. Gray, Union, N.H.; Jimmy C. Rogers, Berwick, Me.; Michael J. Larson, Macomb Township, Mich.

[73] Assignee: Davidson Textron Inc., Dover, N.H.

[21] Appl. No.: 614,488

[22] Filed: Mar. 13, 1996

[51] Int. Cl.⁶ ............................................. B60R 21/16
[52] U.S. Cl. ................................. 280/728.2; 280/732
[58] Field of Search ........................... 280/728.2, 731, 280/732

[56] References Cited

U.S. PATENT DOCUMENTS 5,403,033  4/1995  Koma ..................................... 280/728.2
5,405,164  4/1995  Paxton et al. ........................ 280/728.2
5,419,583  5/1995  Sakakida et al. .................... 280/728.2
5,435,596  7/1995  Rose et al. ........................... 280/728.2
5,441,299  8/1995  Lauritzen et al. ................... 280/728.2
5,489,116  2/1996  Boag .................................... 280/728.2
5,516,145  5/1996  Williams et al. ..................... 280/732
5,527,064  6/1996  Kai et al. ............................. 280/728.2

*Primary Examiner*—Kenneth R. Rice
*Attorney, Agent, or Firm*—Reising, Ethington, Barnard & Perry

[57] ABSTRACT

A reaction canister of a PSIR airbag system includes a U-shaped body closed at its ends by a pair of end plates. Mounting slots are formed in the end plates and cooperate with a pair of associated latching devices for mounting the canister on a cross-car beam of a vehicle.

13 Claims, 2 Drawing Sheets

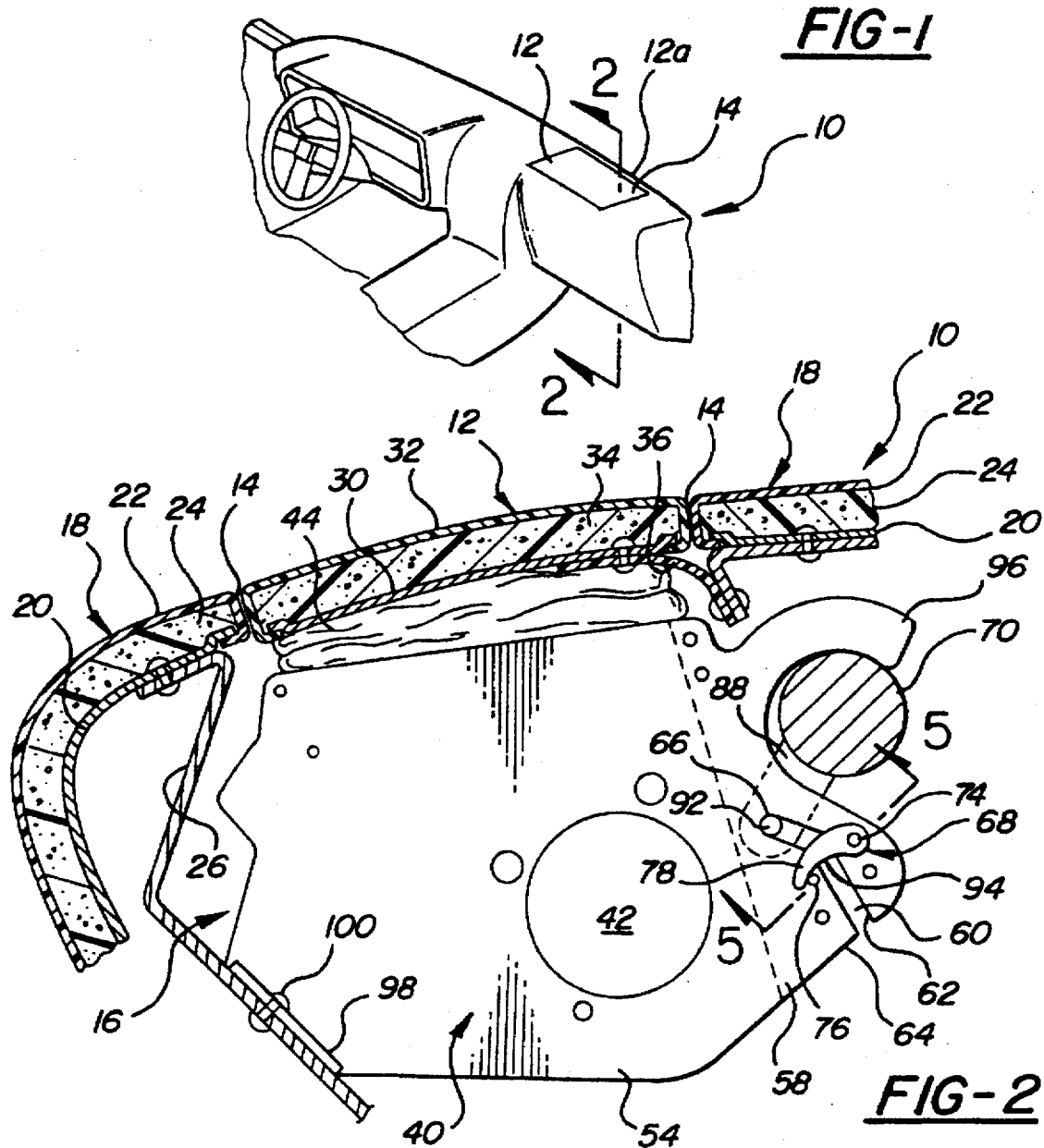
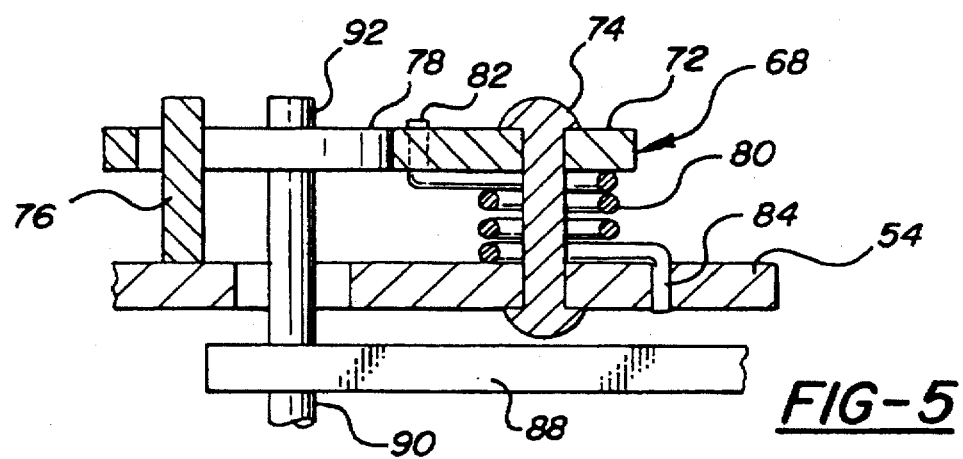

MOUNTING SYSTEM FOR AIRBAG REACTION CANISTER

This invention relates generally to passenger safety inflatable restraint (PSIR) airbag systems for automotive vehicles and more particularly to the manner in which the reaction canister of the PSIR, system is mounted in the vehicle.

BACKGROUND OF THE INVENTION

An automotive airbag restraint system typically includes a reaction canister which houses at least part of an inflatable airbag and an airbag inflator for deploying the airbag from the canister into the passenger compartment of the vehicle through an opening in the canister. The canister, airbag, and inflator are normally attached as a unit to the retainer structure of the vehicle's instrument panel or dashboard assembly. To mount the unit in such manner, the canister is usually formed with a mounting flange that extends about the deployment opening of the canister and is secured by numerous fasteners to the retainer structure of the instrument panel.

The numerous fasteners make the installation of such an airbag unit a very labor intensive process. Further, the integrity of the mount depends, to a large degree, on the integrity of the retainer. Damage that may occur to the instrument panel in a collision could affect the support it provides to the unit and hence may negatively impact its performance.

One of the principal objects of the present invention is to provide a means of securing the airbag canister to support structure of the vehicle other than the instrument panel and in such a way that simplifies the installation of the canister.

SUMMARY OF THE INVENTION AND ADVANTAGES

The invention is directed toward an improvement in the mounting of an airbag reaction canister in an automotive vehicle of the type having walls defining a generally U-shaped body that is closed at its opposite ends by a pair of opposing end plates and which provides a deployment opening for the discharge of an airbag from the canister into the passenger compartment of the vehicle in which the canister is mounted. The improvement includes the provision of mounting slots in the end plates of the canister that are open to receive mounting pins secured to the cross-car beam of the vehicle slidably into the slots and associated latching devices carried by the end plates and movable from first open positions to permit the insertion of the mounting pins into the slots to second closed positions in which the latching devices confront and retain the mounting pins within the slots thereby to secure the canister to the cross car beam of the vehicle.

According to a further aspect of the invention, the latching devices comprise spring-biased pawls that are coupled pivotally to the end plates on one side of the slots and urged constantly by a return spring toward the closed or latched position in which the pawls extend across the slots and engage associated pawl stops provided on the opposite side of the slots. In this way, the canister can be installed by simply extending the mounting pins into the slots past the pawls which deflect to the open position to allow the pins to pass by and then are returned by the force of the springs to their latched positions to retain the pins in the slots.

Accordingly, the present invention provides a simple, cost efficient and reliable mounting system and method of installation for a reaction canister that enables the canister to be attached to the cross-car beam of the vehicle such that it is not reliant entirely on the retainer structure of the instrument panel for support.

THE DRAWINGS

These and other features and advantages of the present invention will become more readily apparent to those skilled in the art by reference to the following detailed description when considered in connection with the accompanying drawings, wherein:

FIG. 1 is a perspective view of an instrument panel or dashboard of an automotive vehicle having a PSIR airbag system mounted behind the instrument panel;

FIG. 2 is an enlarged fragmentary sectional view taken generally along line 2—2 of FIG. 1;

FIG. 5 is an enlarged sectional view of the latch device taken generally along line 6—6 of FIG. 2.

DETAILED DESCRIPTION

Figure 3:
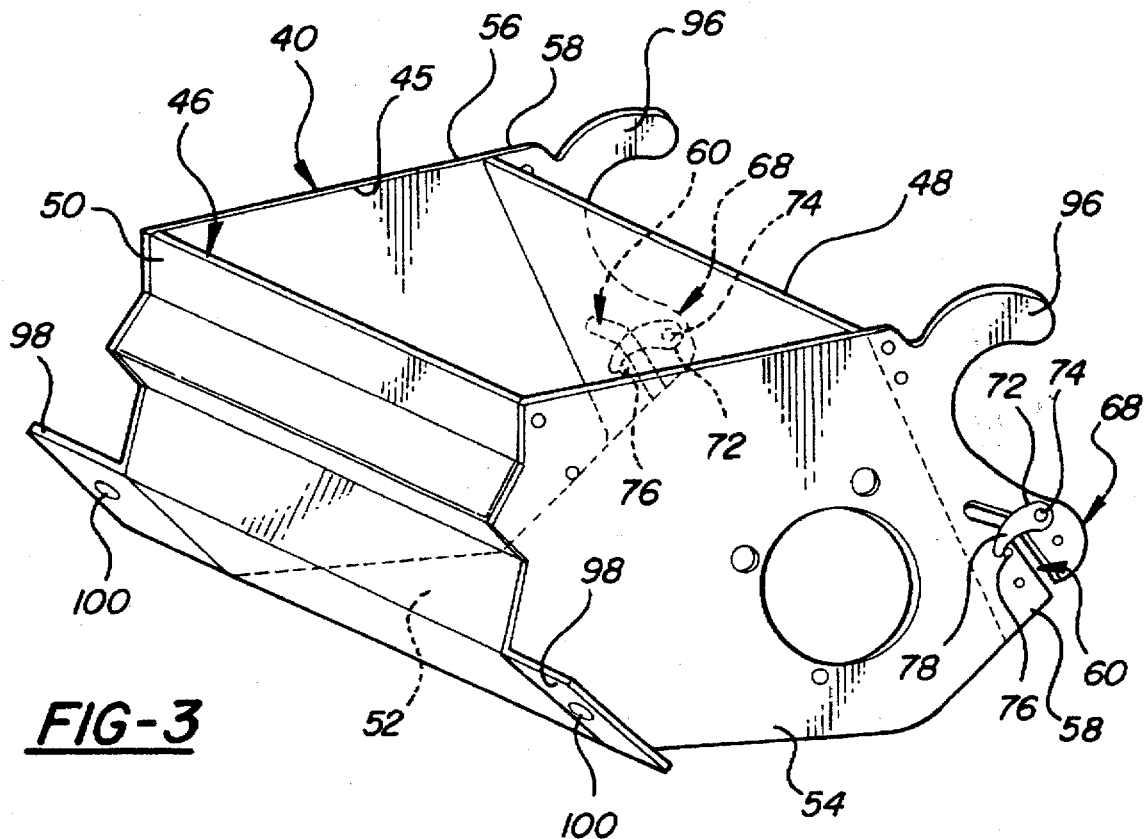
FIG. 3 is a perspective view of a reaction canister constructed according to the invention.

FIG. 1 shows a dashboard or instrument panel 10 of an automotive vehicle having an airbag door 12 located within an opening 14 of the instrument panel 10 for closing the opening and concealing a passenger safety inflatable restraint (PSIR) airbag system 16 constructed in accordance with the present invention and shown best in FIG. 2.

The instrument panel 10 has a cover 18 comprising a molded plastic or metal base panel 20, an outer flexible skin or facing layer 22 of vinyl or thermoplastic material, and a cushion of foam 24 which is molded in place between the base 20 and the skin 22, according to conventional trim molding practice. The cover 18 is mounted on rigid metal understructure or retainer 26 of the instrument panel 10, which in turn is secured to support structure (not shown) of the vehicle body to support the cover 18 in position within the interior of the vehicle.

The deployment door 12 is similarly constructed and includes a plastic or metal base 30, an outer flexible vinyl or thermoplastic skin 32, and a cushion of foam 34 molded in place therebetween. A hinge strap or tether 36 is secured to the door 12 adjacent its front edge 12a into the retainer 26 of the panel to control the upward pivotal movement of the door 12 during deployment of the airbag.

As illustrated in FIG. 2, the airbag system 16 has a reaction canister 40 in which an inflator device 42 is housed and coupled at its outlet to a mouth of a collapsed and folded airbag 44 which is deployable through an open top 45 of the canister 40 as shown in FIG. 3. The canister 40 has a U-shaped body portion 46, also shown in FIG. 3, formed preferably as an extruded aluminum member presenting a front wall 48, a rear wall 50, and a bottom wall 52. Opposite ends of the body 46 are closed by steel end plates 54, 56 to provide side walls to the canister 40.

As illustrated in FIGS. 2 and 3, the end plates 54, 56 are preferably mirror images of one another and hence they share common features. Thus, for sake of clarity, reference numerals applied to the features of one end plate will be understood to be applied equally to the same features of the other end plate. The end plates 54, 56 have flange projections 58 projecting forwardly beyond the front wall 48 of the canister body 46. Each flange projection 58 has a mounting slot 60 provided therein extending from an open end 62 at a lower marginal edge 64 of the flange 58 generally upwardly and then forwardly at an angle and terminating within the flange projection 58 at a closed end 66.

Associated with each slot 60 is a latching device 68 which cooperates with the slots 60 to secure the canister 40 to a cross-car beam or tie bar 70 of the vehicle, as will be explained in greater detail below. Preferably, the latching devices 68 comprise latch pawls 72 coupled by pivot pins 74 to the respective end plates 54, 56 adjacent one side of the slots 60 in spaced relation to the closed ends 66 of the slots 60 for cooperation with pawl stops 76 provided on the end plates 54, 56 adjacent the opposite side of the slots 60. A latching arm 78 of each pawl extends outwardly of the pivot pins 74 and is swingable about the pivot pins 74 between a closed or latched position, shown in solid lines in FIG. 2, in which the latching arms 78 extend across the mounting slots 60 and abut the pawl stops 76, and an unlatched open position, illustrated by broken lines in FIG. 2, in which the latching arms 78 are pivoted upwardly and out of the path of the slots 60. As illustrated best in FIG. 5, the latching devices 68 also preferably include return springs 80 carried about the pivot pins 74 and coupled by spring ends 82, 84 to the pawls 72 and end plates 52, 54, respectively, to bias the pawls 72 with constant force toward their closed or latched positions.

Figure 4A:
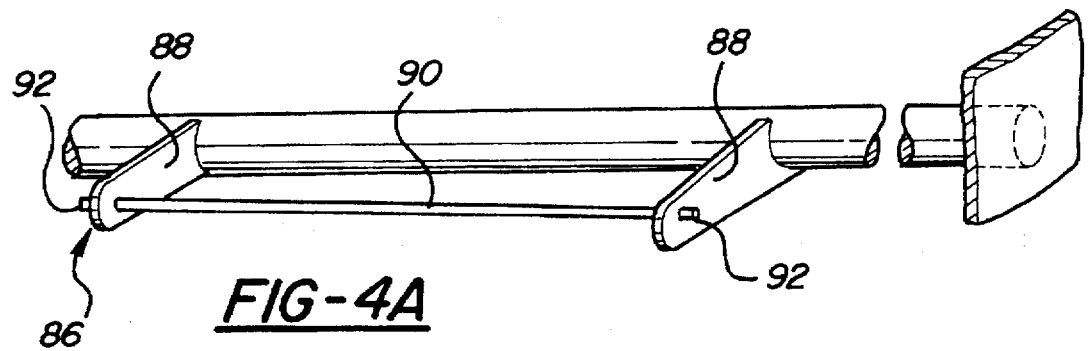
FIGS. 4a and 4b are diagrammatic perspective views illustrating two alternative hanger arrangements for mounting the canister on the cross-car beam of the vehicle.
Figure 4B:
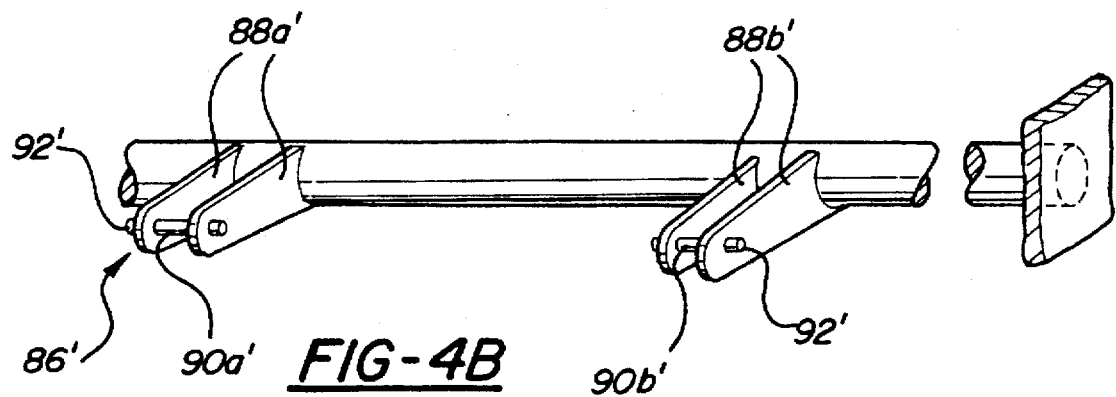

FIGS. 4a and 4b illustrate two alternative hanger mounts 86, 86' that may be provided on the beam 70 to accommodate the mounting of the canister. In FIG. 4a, the beam 70 is fitted with a pair of outwardly projecting support arms 88 that are welded or otherwise secured to the beams 70 and a mounting pin or rod 90 that extends between and is supported by the arms 88 and includes end projections 92 that extend a predetermined distance outwardly beyond the arms 88.

In FIG. 4b, the beam 70 has two sets of support arms 88a', 88b' and a pair of mounting pin or rod sections 90a' and 90b' extending between and supported by the respective support arm pairs 88a', 88b'. The rod sections include similar end projections 92' that likewise extend a predetermined distance outwardly beyond the support arms 88a', 88b'.

To mount the canister 40 on the hanger 86 of FIG. 4a, the end plates 54, 56 of the canister are positioned to the outside of support arms 88 and the end projections 92 of the mounting pin 90 guided into the slots 60 through the open ends 62 thereof. Mounting the canister 40 on the hanger 86' of FIG. 4b is accomplished in the same manner in which the support arms 88a', 88b' are positioned to the inside of the end plates 54, 56 and the end projections 92' guided into the slots. Accordingly, the remaining description will be directed to the mounting of the canister 40 on the hanger 86 of FIG. 4a, with it being understood that the procedure is equally applicable to the mounting hanger 86' of FIG. 4b.

As the end projections 92 are extended further into the slots 60, they engage a facing surface 94 of the pawls 72, causing them to pivot upwardly under the force of insertion toward their open positions allowing the end projections 92 to pass by the pawl 72, at which point the springs 80 recoil to return the pawl 72 automatically to their closed positions against the pawl stops 76, thereby closing off the slots 60 and trapping the pin projections 92 within a socket formed between the pawls 72 and the closed ends 66 of the slots 60.

As illustrated best in FIG. 2, the end plates 54, 56 may also include hook or hanger portions 96 that extend over the top of the beams 70 to provide supplemental support to the canister 40 and to assist in aligning the canister 40 during its installation. The plates 54, 56 may also include mounting flanges 98 projecting laterally outwardly toward the rear of the canister 40 and formed with openings 100 to receive suitable fasteners for securing the flanges 98 to the retainer structure 26 of the instrument panel 10 to provide still further support to the canister 40 when mounted in position beneath the instrument panel 10.

In operation, when the vehicle experiences a predetermined impact, the inflator 42 is activated to inject pressurized gas into the airbag 44 causing it to inflate and exert sufficient pressure on the backside of the door 12 whereupon the door 12 swings open allowing the airbag 44 to escape into the passenger compartment of the vehicle through the opening 14 in the instrument panel 10. The interaction between the mounting pin projection 92 and the end 66 of the slots 60 carries the load of any downward forces exerted on the canister 40 together with the hanger portions 96 and the mounting flanges 98. Upward forces on the canister 40 are borne by the mounting flanges 98 and the interaction between the pin projections 92 and the pawls 72 which serve to prevent the pin projections 92 from sliding out of the slots 60.

The invention has been described in an illustrative manner, and it is to be understood that the terminology which has been used is intended to be in the nature of words of description rather than of limitation. Obviously, many modifications and variations of the present invention may be made in light of the above teachings and it is therefore to be understood that the disclosed embodiments are representative of presently preferred forms of the invention and are intended to be illustrative rather than definitive thereof. The invention is defined in the appended claims.

What is claimed is:

1. In a reaction canister of an automotive PSIR airbag system having walls defining a generally U-shaped body closed at opposite ends by a pair of opposing end plates and providing a deployment opening for the discharge of an air bag from the canister into the passenger compartment of a vehicle in which said canister is mounted, wherein the improvement comprises:

mounting slots provided in said end plates open to receive mounting pin portions of a cross-car beam structure of the vehicle slidably therein and associated latching devices carried by said end plates and movable from first open positions to permit the insertion of the mounting pins into said slots, to second closed positions in which said latching devices block and retain the mounting pins within said slots to thereby secure said canister to the cross-car beam of the vehicle.

2. In the canister of claim 1 wherein said latching devices comprise a pair of latch pawls pivoted to said end plates and an associated pair of pawl stops provided on said end plates adjacent said latch pawls in position to confront said pawls when the latter are moved to said closed position.

3. In the canister of claim 2 wherein said latch pawls are pivoted to said end plates adjacent said slots and include latching arm portions thereof extendible at least partially across said slots.

4. In the canister of claim 3 wherein said slots terminate at closed ends within said end plates and said latching portions of said latch pawls are spaced from said closed ends when in said closed positions.

5. In the canister of claim 4 wherein said latch device includes a pair of springs acting between said latch pawls and said end plates to urge said latch pawls constantly toward said closed positions.

6. In the canister of claim 5 wherein said latch pawls are arranged to engage said mounting pin portions upon their insertion into said slots causing said latch pawls to pivot under the force of insertion from said closed position toward said open position against the force of said springs to permit the passage of said mounting pin portions thereby whereupon said springs return said latch pawls automatically to their closed positions to retain the mounting pin portions within said slots.

7. In the canister of claim 6 wherein said latch pawls are pivoted to said end plates adjacent one side of said slots and said pawl stops are secured to said end plates adjacent the other side of said slots.

8. In the canister of claim 2 wherein said end plates include flange projections extending beyond said body of said canister and having said slots provided therein.

9. In the canister of claim 1 wherein said U-shaped body comprises an aluminum extrusion member and said end plates comprise steel plate members.

10. A method of mounting a reaction canister of an automotive PSIR airbag system on support structure of an automotive vehicle, said method comprising the steps of:

preparing a reaction canister having a generally U-shaped body closed at opposite ends by a pair of end plates and a deployment opening for the escape of an airbag into the passenger compartment of the vehicle;

providing mounting slogs in the end plates and associated latching devices on the end plates adjacent the slots;

providing mounting pin portions on a cross-car support beam of the vehicle;

mounting the canister on the beam by guiding the mounting pin portions slidably into the slots and positioning the latching devices to block and retain the mounting pin portions within the slots.

11. In the method of claim 10, preparing the latching devices to include a pair of latch pawls pivoted to the end plates adjacent the slots and a pair of associated pawl stops carried by the end plates adjacent the latch pawls, and moving the latch pawls to an open position to permit the mounting pin portions to be inserted into the slots and thereafter moving the latch pawls to a closed position abutting the pawl stops to capture and retain the mounting pin portions within the slots.

12. In the method of claim 11, providing each latch pawl with a spring to urge the latch pawls constantly toward their closed position, and deflecting the latch pawls toward their open positions in response to inserting the mounting pin portions into the slots and past the latch pawls and thereafter automatically returning the latch pawls by force of the springs to their closed positions to capture and retain the mounting pin portions within the slots.

13. In the method of claim 11, securing support arms to the cross-car beam of the vehicle and securing the mounting pin portions on the support arms.

* * * * *